Feb. 20, 1945. J. M. CRESPO 2,370,012
SKID AIRCRAFT AND LANDING RAILER SYSTEM
Filed Feb. 15, 1943 2 Sheets-Sheet 1
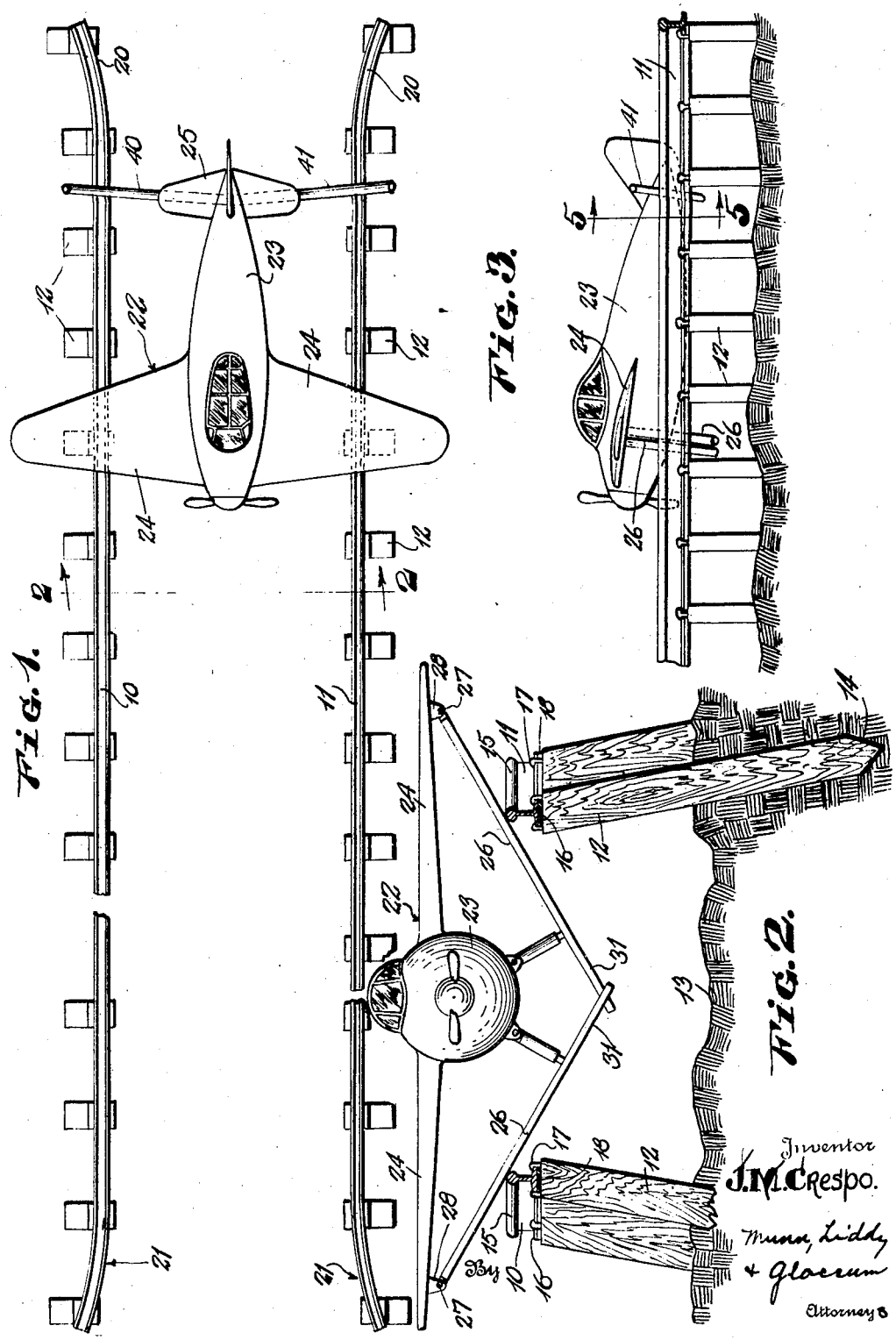

Feb. 20, 1945. J. M. CRESPO 2,370,012
SKID AIRCRAFT AND LANDING RAILER SYSTEM
Filed Feb. 15, 1943 2 Sheets-Sheet 2
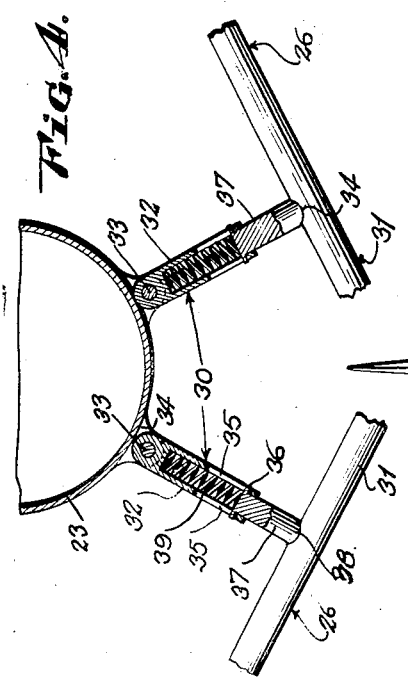
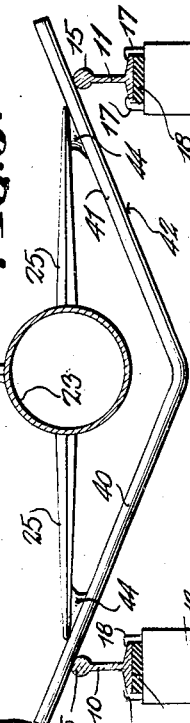
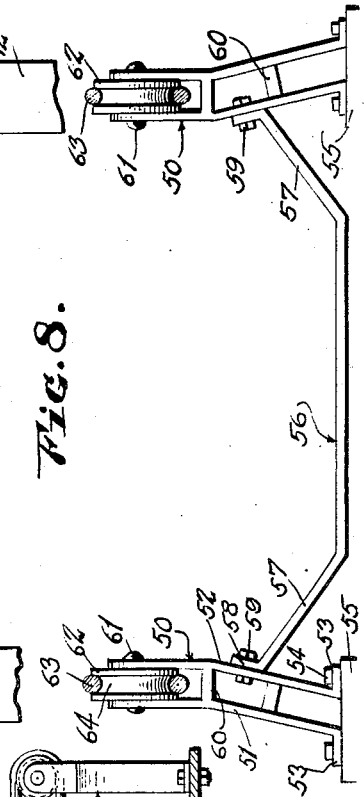
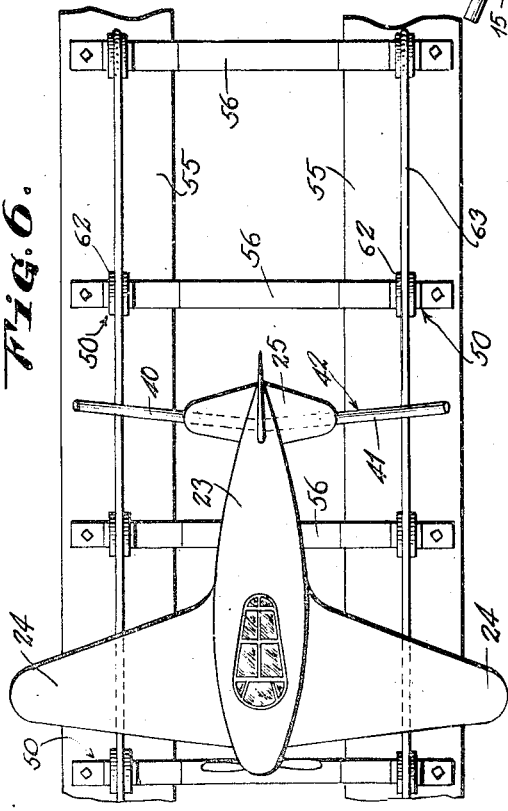
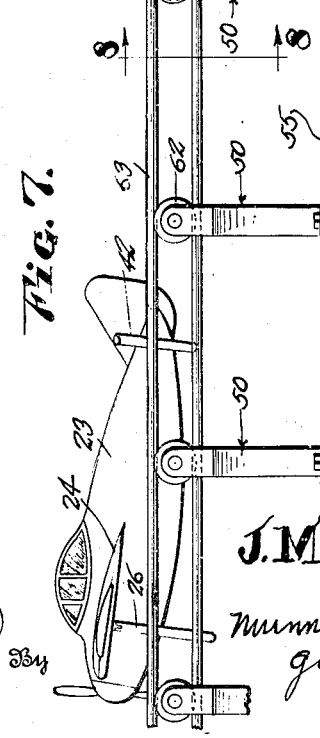
J. M. Crespo, Inventor Patented Feb. 20, 1945

2,370,012

UNITED STATES PATENT OFFICE 2,370,012

SKID AIRCRAFT AND LANDING RAILER SYSTEM

Jose Mariano Crespo, Guatemala City, Guatemala

Application February 15, 1943, Serial No. 475,987

6 Claims. (Cl. 244—114)

This invention relates to a landing device for airplanes.

An object of the invention is the provision of a pair of spaced longitudinal tracks elevated above the ground surface so that when the airplane descends or takes off, pairs of skids secured transversely to the airplane will ride on the tracks which may be in the form of rails or endless bands supported by rollers.

Another object of the invention is the provision of a landing gear for airplanes in which pairs of skids are connected in spaced relation to the airplane, one skid of each pair being disposed at an obtuse angle to the other skid of the pair, cushioning means being employed for connecting the inner ends of one pair of skids to the fuselage, the other end of said skids being pivotally connected to the ends of the wings.

A further object of the invention is the provision of a landing gear for an airplane adapted to alight or ascend from a pair of tracks, a pair of skids being connected to the forward end of the fuselage by cushioning means and also by a pivotal means, a second pair of skids which is in the form of a bent bar being connected to the tail portion of the airplane, the skids being disposed transversely of the airplane so that the ends of the skids will freely slide upon the tracks.

A still further object of the invention is the provision of a landing apparatus which may be quickly assembled and placed in position so that a specially constructed airplane may take off from the same, the landing apparatus being of such construction that it may be readily placed in position within a short time whereby it is unnecessary to level off the field and apply concrete or other materials to give a smooth surface, since the landing apparatus can be placed in position over rough surfaces and the material required for erecting the landing apparatus being of such small quantity that the enormous hauling required to prepare runways is considerably reduced.

This invention will be best understood from a consideration of the following detailed description, in view of the accompanying drawings forming a part of the specification; nevertheless, it is to be understood that the invention is not confined to the disclosures, being susceptible of such changes and modifications as define no material departure from the salient features of the invention as expressed in the appended claims.

In the drawings:

Fig. 1 is a plan view of a landing apparatus showing a specially constructed airplane thereon.

Fig. 2 is a transverse vertical section taken along the line 2—2 of Fig. 1.

Fig. 3 is a side view of the landing apparatus, with the airplane in position.

Fig. 4 is a fragmentary vertical section through the supports for the front skids of the airplane.

Fig. 5 is a transverse vertical section taken along the line 5—5 of Fig. 3.

Fig. 6 is a plan view of a modified form of landing apparatus.

Fig. 7 is a side view of the apparatus shown in Fig. 6.

Fig. 8 is a transverse vertical section taken along the line 8—8 of Fig. 7.

Referring more particularly to Figs. 1 to 5 inclusive, it will be seen that a pair of spaced longitudinal members in the form of rails 10 and 11 are mounted on posts 12 at a predetermined horizontal level above the surface 13 of the ground. The posts 12 may have their lower ends sharpened as shown at 14 and driven into the ground, or holes may be dug and the posts will then be set in concrete. On the other hand, holes may be dug in the ground, and after the posts have been placed therein so that their upper ends will be all in the same horizontal level, the dirt may then be tamped around the lower end of said post.

The rails 10 and 11 are provided with a rounded bead 15 and are also provided with a flange 16 which is secured by spikes 17 or other suitable fastening means to the tops of the posts 11 with wear plates 18 between the flanges 16 and the upper ends of the posts.

The posts 12 are spaced apart in sufficient numbers to properly support the rails. It will be noted that the outer ends of these rails are flared outwardly as shown at 20 and 21 for a purpose which will be presently explained.

These rails and supporting elements constitute a runway or landing apparatus for a specially constructed airplane designated by the numeral 22. This airplane has the usual fuselage 23, wings 24, and tailpiece 25.

Each of a pair of skids 26 is pivotally supported at 27 from a pair of ears 28 which is secured to and depends from the underfacing of the outer ends of the wings 24. A cushioning device 30 connects the inner ends 31 of the skids 26 to the undersurface of the fuselage at the forward end of the airplane. Each cushioning device, as shown in Fig. 4, consists of a cylinder 32, pivotally connected on a pin 33 supported by ears 34, extending downwardly from the bottom of the fuselage 23. This cylinder is provided with a pair of diametrically disposed slots 35, which receive lugs 36 extending from the inner end of a rod 37 which is connected at 38 to the inner end of a skid 26. It will be noted that the rod 37 is slidably mounted in the cylinder 32 and acts against the tension of a spring 39 located in the cylinder. It will be seen by this construction that when pressure is exerted on the skids 26, the rods 37 will be forced inwardly of the cylinders 32, with the springs 39 forming a cushioning means to reduce the shock against the airplane and against the skids 26 when the skids engage the rails 10 and 11 during the process of landing.

Referring more particularly to Fig. 5, it will be seen that the rear skids 40 and 41 are formed from a single rod 42 which is bent intermediate its ends, as shown at 43. The rods 40 and 41 adjacent their outer free ends are secured at 44 to the ends of the tail piece 25, which projects laterally from the side edges of the rear end of the fuselage 23. The bent end 43 of the rod 42 is spaced below the bottom of the fuselage.

Referring more particularly to Figs. 6, 7, and 8, it will be seen that a modified form of landing apparatus is provided in which the posts or standards 50 are formed of spaced metal bars 51 and 52, which are inclined to the vertical with flanges 53 at their lower ends which are bolted or secured in any approved manner as shown at 54 to longitudinal planks 55. The planks may be rigidly secured to the ground or the posts may be connected by transverse bars 56 which have angular portions 57 extending upwardly at their ends, with flanges 58 bolted or riveted to one bar 52 of the standards 50. Spacing sleeves or rods 60 maintain the bars 51 and 52 in a pre-determined position with respect to each other.

Each pair of bars 51 and 52 is provided with an axle 61 upon which is rotatably mounted a pulley 62. Over these pulleys is trained a cable 63 at each side of the landing device. The groove 64 in each pulley 62 is such as compared to the diameter of the cable 63, that these cables will extend above the peripheries of the pulleys so that the skids 26 and the skids 40 and 41 will not come in contact with the pulleys, but will rest on the cables which are disposed in parallel spaced relation.

The pulleys and likewise the cables are free to be moved when the skids frictionally contact the cables, but the movement of the cables will be restricted so that the airplane, when landing on this form of device, will not be carried beyond or off the cables.

The construction just described is such that an airplane of special construction may readily land upon the device, and no greater skill will be required for the aviator to land on this type of construction than on the deck of an airplane carrier, and no greater length of track will be required for the landing of an airplane on this type of device than will be required on the deck of an airplane carrier. However, this type of device will require only a minimum of space for the landing of an airplane, and the landing apparatus can be applied to rough terrain, thus eliminating the necessity of leveling off a space. Furthermore, there will be an elimination of considerable material for building this type of landing field.

In addition to the V-shaped landing gear defined the plane may be provided with light retractable wheels at the front and rear for emergency landings. In view of the fact that such retractable wheels are well-known in the art, they have not been illustrated.

I claim:

1. A landing device for airplanes comprising pairs of skids disposed transversely of and below the fuselage, one skid of each pair being located at an angle to the other skid with the inner ends of the skids of each pair being closely associated, cushioning means connecting the inner ends of one pair of skids to the fuselage, and means pivotally connecting the outer ends of said pair of skids to the wings of said airplane, the other pair of skids being rigidly connected to the tail of said airplane.

2. A landing device for airplanes comprising pairs of angularly and transversely disposed skids, one pair of skids being connected to the forward end of the fuselage, the other pair being secured to the rear end of said fuselage, a cushioning means forming a connection between the fuselage and the first mentioned pair of skids, and means pivotally connecting an end of each of the first-mentioned pair of skids to an end of an adjacent wing of the airplane.

3. A landing device for airplanes comprising pairs of angularly and transversely disposed skids, one pair of skids being connected to the forward end of the fuselage, a rod bent intermediate its ends to form the other pair of skids, the airplane having a tail piece extending laterally from the opposite sides of the rear end of the fuselage, means securing the ends of the tail piece to the second pair of skids, and a cushioning means forming a connection between the fuselage and the first mentioned pair of skids.

4. A landing device for airplanes comprising pairs of angularly and transversely disposed skids, one pair of skids being connected to the forward end of the fuselage, a rod bent intermediate its ends to form the other pair of skids, the airplane having a tail piece extending laterally from the opposite sides of the rear end of the fuselage, means securing the ends of the tail piece to the second pair of skids, and a cushioning means forming a connection between the fuselage and the first mentioned pair of skids, and means also pivotally connecting the first mentioned skids to the wings of the airplane.

5. A landing device for airplanes comprising pairs of angularly and transversely disposed skids, one pair being located adjacent the wings, the other pair being disposed beneath the tailpiece, cushioning means connecting the inner ends of the first pair of skids to the fuselage, means pivotally connecting the outer ends of said skids to the underface of the ends of the wings, and means connecting the outer ends of the other pair of skids to the opposite ends of the tailpiece.

6. A landing device for airplanes comprising pairs of angularly and transversely disposed skids, one pair being located adjacent the wings, the other pair being disposed beneath the tailpiece, cushioning means connecting the inner ends of the first pair of skids to the fuselage, means pivotally connecting the outer ends of said skids to the underface of the ends of the wings, and means connecting the outer ends of the other pair of skids to the opposite ends of the tailpiece, the inner ends of the skids of the last mentioned pair being rigidly connected together.

JOSE M. CRESPO.